US008483727B2

(12) United States Patent
Shkolnikov et al.

(10) Patent No.: US 8,483,727 B2
(45) Date of Patent: Jul. 9, 2013

(54) DETERMINING SIZE OF EMAIL MESSAGE SENT OVER WIRELESS NETWORK BASED ON CONTENT

(75) Inventors: Pavel Shkolnikov, Waterloo (CA); Cheryl Mok, Waterloo (CA); Dimitri Mostinski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 492 days.

(21) Appl. No.: 12/499,993

(22) Filed: Jul. 9, 2009

(65) Prior Publication Data

US 2010/0009653 A1 Jan. 14, 2010

Related U.S. Application Data

(60) Provisional application No. 61/079,270, filed on Jul. 9, 2008.

(51) Int. Cl.
*H04W 4/12* (2009.01)
*H04W 4/00* (2009.01)

(52) U.S. Cl.
USPC ............................. 455/466; 455/405; 709/206

(58) Field of Classification Search
USPC .................................................. 455/405, 466
See application file for complete search history.

(56) References Cited

U.S. PATENT DOCUMENTS

| 7,076,241 | B1 * | 7/2006 | Zondervan ..................... 455/466 |
| 7,346,659 | B2 * | 3/2008 | Matsuura et al. .......... 455/412.1 |
| 2001/0007992 | A1 * | 7/2001 | Nakaoka ........................ 709/206 |
| 2002/0087628 | A1 * | 7/2002 | Rouse et al. ................... 455/556 |
| 2002/0113994 | A1 * | 8/2002 | Smith et al. .................... 358/1.15 |
| 2003/0154256 | A1 * | 8/2003 | Hadano et al. ................ 709/206 |
| 2006/0031300 | A1 | 2/2006 | Kock |
| 2006/0277257 | A1 * | 12/2006 | Kromann et al. ............. 709/206 |
| 2007/0016636 | A1 * | 1/2007 | Boerries et al. ............... 709/200 |
| 2007/0130255 | A1 * | 6/2007 | Wolovitz et al. .............. 709/204 |
| 2008/0243619 | A1 | 10/2008 | Sharman et al. |
| 2008/0263169 | A1 * | 10/2008 | Brabec et al. ................. 709/206 |
| 2009/0210498 | A1 * | 8/2009 | Sze et al. ....................... 709/206 |
| 2009/0300121 | A1 * | 12/2009 | Bartlett ......................... 709/206 |

FOREIGN PATENT DOCUMENTS

WO 2007068209 A1 6/2007

OTHER PUBLICATIONS

International Search Report and Written Opinion issued Oct. 26, 2009 in respect of corresponding PCT Application No. PCT/CA2009/000958.
PractiCount and Invoice 2.4, found at http://www.softisland.com/practicount_and_invoice.html; Jun. 11, 2008.
http://total_assistant.surefire-software.alienpicks.com/; Jun. 11, 2008.
Search Report dated Sep. 1, 2009.

* cited by examiner

*Primary Examiner* — Anthony Addy
*Assistant Examiner* — Tangela T. Chambers
(74) *Attorney, Agent, or Firm* — Ridout & Maybee LLP

(57) ABSTRACT

A method, server and system for setting the size of email messages sent to mobile communications devices is provided. In one example embodiment, a method for processing email messages sent to a mobile communications device is provided, comprising: receiving an email message having message content that contains at least a first type of content and a second type of content that is different from the first type; parsing the received email message to determine a quantity of the first type content contained in the email message until a predetermined first content quantity limit is reached, or until the end of the received email message is reached if the first content quantity limit is not reached first; and sending the message content that corresponds to however much of the received email message was parsed to mobile communications device.

17 Claims, 5 Drawing Sheets

DETERMINING SIZE OF EMAIL MESSAGE SENT OVER WIRELESS NETWORK BASED ON CONTENT

This application claims the benefit of and priority to U.S. patent application Ser. No. 61/079,270 filed Jul. 9, 2008, the contents of which are incorporated herein by reference.

TECHNICAL FIELD

The present disclosure relates generally to communication systems and, more particularly to a method, server and system for the delivery of email messages, such as HTML based email messages, to mobile communications devices.

BACKGROUND

When email messages are sent to a mobile communication device over a wireless network it is common to have an absolute size limit for the email message. If the entire email message falls within the size limit, then all of the email message content will be sent to the mobile communication device. However if the email message exceeds the absolute size limit, then only a first part of the email message content that is below the size limit will be sent to the mobile communication device. Typically, where part of an email message is extracted and sent to a mobile communication device, the device user will have the option of requesting that more content from the email message be sent to the mobile communication device.

BRIEF DESCRIPTION OF THE DRAWINGS

Like reference numerals are used in the drawings to denote like elements and features.

DETAILED DESCRIPTION OF EXAMPLE EMBODIMENTS

Example embodiments are described herein in which the size of email message content for an email message that contains both viewable text and other information sent to a receiving mobile communication device is dynamically determined based on a predetermined threshold for the amount of viewable text contained in the email message such that the email message content that is initially pushed to a mobile communication device for an email message will include the predetermined limit of viewable text. In some embodiments, the predetermined threshold for viewable text may be set based on a number of viewable characters, or a may be set according to a number of lines of viewable text, or both. In at least some applications the device user can be provided with a more consistent user experience and in at least some applications the instances of device users requesting additional email message content for a previously received email message will be reduced.

According to one example embodiment, an email message having message content that contains at least a first type of content and a second type of content that is different from the first type is received for sending to a mobile communications device. The received email message is parsed to determine a quantity of the first type content contained in the email message until a predetermined first content quantity limit is reached, or until the end of the received email message is reached if the first content quantity limit is not reached first. An email message content that corresponds to however much of the received email message was parsed is then sent to a mobile communications device.

Figure 1:
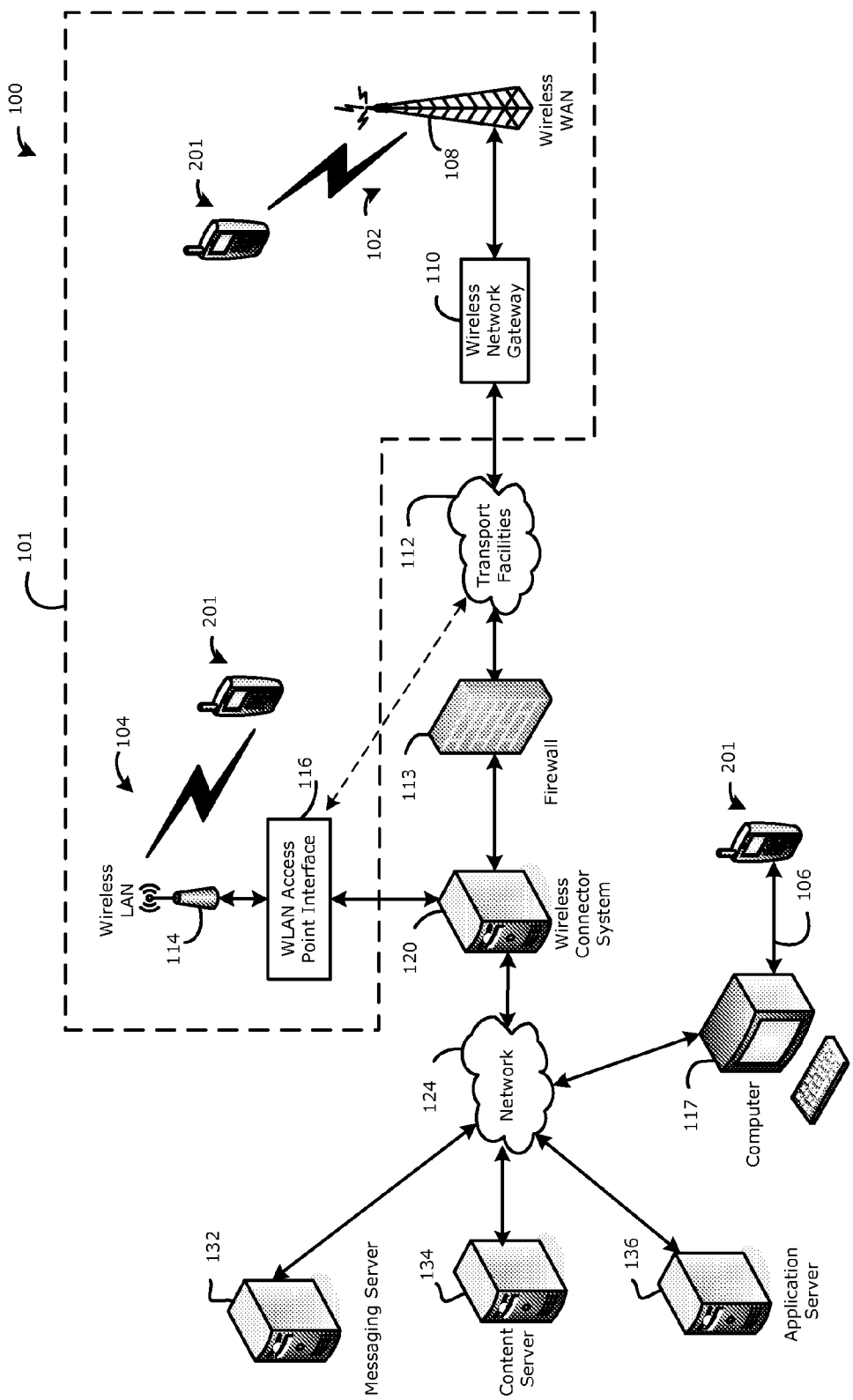
FIG. 1 is a block diagram illustrating a communication system including a mobile communication device to which system example embodiments of the present disclosure can be applied.

In order to facilitate an understanding of one possible environment in which example embodiments described herein can operate, reference is first made to FIG. 1 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the internet rather than or in addition to an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi™) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line in FIG. 1 via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange, IBM Lotus Domino, or Novell GroupWise email server), a content server 134 for providing content such as internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public internet or combinations thereof and may include virtual networks constructed using any of these, alone, or in combination. A mobile communication device 201 may alternatively connect to the wireless connector system 120 using a computer 117, such as desktop or notebook computer, via the network 124. A link 106 may be provided for exchanging information between the mobile communication device 201 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A Personal Area Network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. Suitable variations of the communication system will be understood to a person of skill in the art and are intended to fall within the scope of the present disclosure.

In example embodiments, the mobile communication device 201 is a two-way communication device having at least data and possibly also voice communication capabilities, and the capability to communicate with other computer systems, for example, via the public internet. Depending on the functionality provided by the mobile communication device 201, in various embodiments the device may be, by way of example but not limitation, a data communication device, a multiple-mode communication device configured for both data and voice communication, a mobile telephone, a PDA (personal digital assistant) enabled for wireless communication, a smart phone, or a laptop computer with a wireless modem.

In some embodiments, the mobile communication device 201 is a handheld electronic device which includes a rigid case (not shown) for housing components of the device 201 and is configured to be held with one or two hands while the device 201 is in use. In some embodiments, the handheld electronic device is small enough to fit inside a purse or coat pocket or belt mounted holster.

Figure 2:
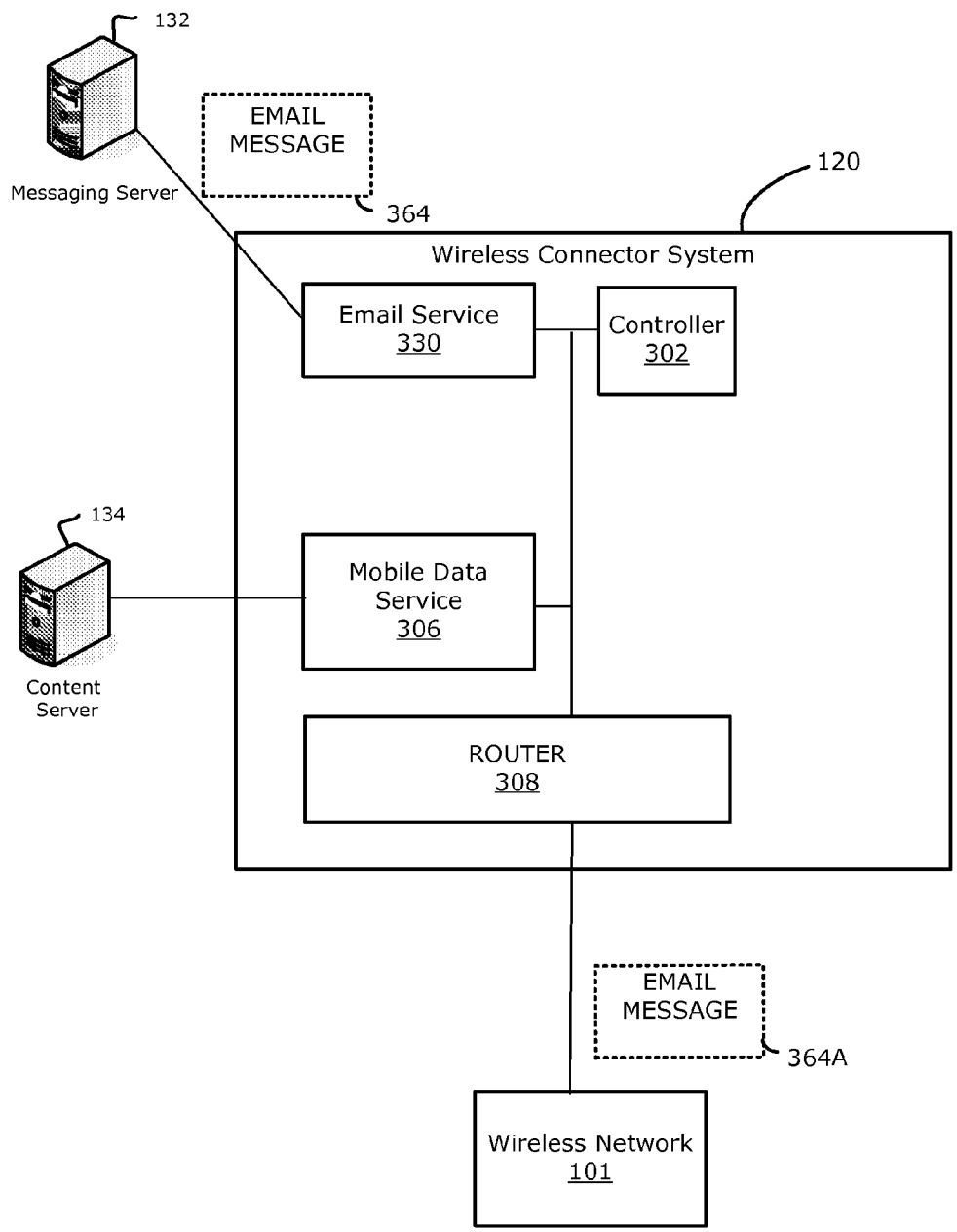
FIG. 2 is a block diagram illustrating a wireless connector system in accordance with one embodiment of the present disclosure.

Referring now to FIG. 2, the wireless connector system 120 for use in accordance with one embodiment of the present disclosure will now be described in more detail. The wireless connector system 120 may be implemented using any known general purpose computer technology, and may, for example be realized as one or more microprocessor-based server computers implementing one or more server applications configured for performing the processes and functions described herein. The wireless connector system 120 is configured to implement a number of components or modules, including by way of non-limiting example, a controller 302, a mobile data service 306, a router 308 and an email service 330. The wireless connector system may include more of or fewer than the modules listed above. In one example embodiment, the wireless connector system 120 includes one or more microprocessors that operate under stored program control and execute software to implement these modules. The software may for example be stored in memory such as persistent memory.

Controller 302 monitors the various components or modules of the wireless connector system and restarts them if they stop working. The mobile data service 306 enables mobile communication devices 201 to access content available through content server 134, such as, but not limited to, web content, the internet, and an organization's intranet and content servers. Router 308 connects to the wireless network 101 to send data to and from mobile communication devices 201. Email service 330 connects to messaging server 132 to provide messaging services, including processing message attachments that are sent to mobile communication devices 201.

The controller 302, email service 330, mobile data service 306, and router 308 modules may, among other things, each be implemented through stand-alone software applications, or combined together in one or more software applications, or as part of another software application. In some embodiments, the functions performed by each of the above identified modules may be realized as a plurality of independent elements, rather than a single integrated element, and any one or more of these elements may be implemented as parts of other software applications.

Together with the other modules described above, the email service 330 configures the wireless connector system 120 to perform, at least in part, the functions of a mobile email server and in this regard the wireless connector system 120 receives email messages 364 from messaging server 132, processes the received email messages for sending to mobile communication devices 201 in wireless network 101, and then sends the processed email messages 364A to the recipient devices 201.

When email messages are sent to a mobile communication device over a wireless network a size limit can be applied to the email message such that, if the entire email message falls within the size limit, then all of the content of the email message will be sent to the mobile communication device. But if the email message exceeds the size limit, only a first part or selected portion of the email message content that is below the size limit will be sent to the mobile communication device. Typically, where part of an email message is extracted and sent to a mobile communication device, the device user will have the option of requesting that more content from the email message be sent to the mobile communication device. If the amount of information that has been received with the initially sent email message content is sufficient for the user to discern that the email message does not need to be viewed further by the user at that immediate time, the user will typically not select to receive additional content from the mobile email service for the email message. However, when a user does not receive sufficient information to properly conclude that an email message does not need to be immediately viewed further, the user will often request additional content through the wireless network, inconveniencing the user and consuming up network and device resources.

Some email messages include message content expressed in the message body in a formatting language, such as (without limitation) RTF or HTML. When email content is expressed in a formatting language, an email message can include viewable text together with formatting information specifying how the viewable text and other viewable elements in the email message can be viewed. As a result, the amount of content in the email message that is not viewable text can be substantial. Accordingly, while it can be relatively easy to select an absolute file size limit for a plain text email message that will generally result in a consistent amount of viewable text being sent with an email message to the receiving mobile communications device, applying an absolute file size to a formatted email message can result in varying amounts of viewable text being sent with an email message. The amount of viewable text selected by applying an absolute file size limit will vary depending on the relative amount of formatting and other non-viewable information that is contained in the email message content relative to the viewable text it contains.

As noted above, example embodiments are described herein in which the size of email message content sent to a receiving mobile communication device is dynamically determined based on a predetermined threshold for the amount of viewable text contained in the email message such that the email message content that is initially pushed to a mobile communication device for an email message will include the predetermined limit of viewable text. In some embodiments, the predetermined threshold for viewable text may be set based on a number of viewable characters, or a may be set according to a number of lines of viewable text, or both. In at least some applications the device user can be provided with a more consistent user experience and in at least some applications the instances of device users requesting additional email message content for a previously received email will be reduced.

An email message, such as a message in a form defined by Request For Comment (RFC) 822, comprises a header which includes a number of header fields, and a message body. As indicated above, one example of a type of email message in which the message content is expressed in a formatting language is an HTML email message. HTML email messages comprise HTML code within the message body. The HTML code sets out HTML elements that are defined using HTML tags. As known in the art HTML elements often but not always include the following components: a start tag marking the beginning of an element; an end tag marking the end of the element; any number of attributes (and their associated values), typically located in the start tag of the element; and some amount of content (such as text characters) located between the start tag and the end tag. The content can include, among other things, viewable content such as viewable text. The content can also include one or more further HTML elements such that HTML elements can be nested within each other. HTML tags specify what content to present and how to present it. An example of an HTML element is
<h1 align="center"> These characters are viewable text</h1>

In the above example, the start tag is <h1 align="center">, which includes the attribute–"align="center"", the end tag is </h1> and the element content is "These characters are viewable text". The above HTML element includes 58 characters, of which only 34 characters are actually viewable text, which is illustrative of the fact that much of the message content in a formatted email message such as an HTML email message can relate to non-viewable information.

Figure 3:
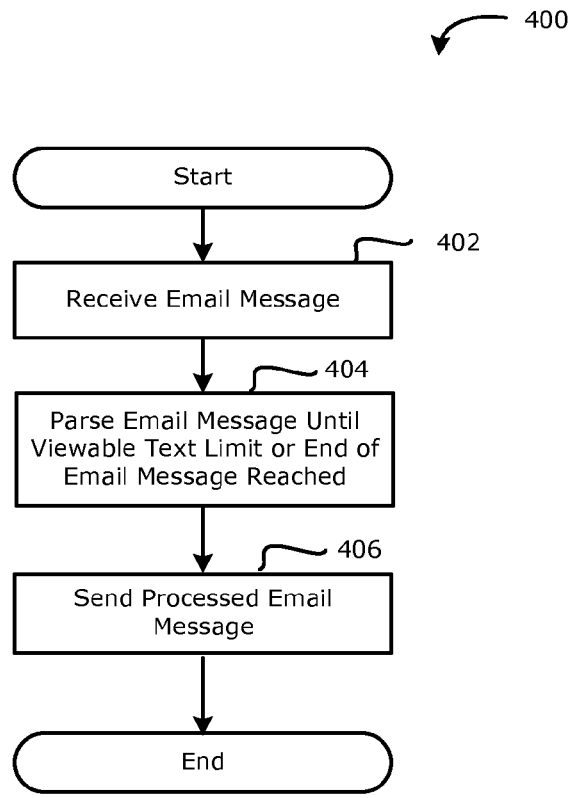
FIG. 3 is a flowchart illustrating a process for processing an email message in accordance with one embodiment of the present disclosure.

An overview having been provided, reference is now made to FIG. 3 which illustrates operations 400 for delivering an email message to the mobile communication device 201 in accordance with one example embodiment of the present disclosure. The operations 400 may be performed by the email service 330 of the wireless connector system 120. In other embodiments, the operations 400 may be performed by a separate server connected to the wireless connector system 120. Although an example embodiment will be first described below in the context of an HTML email message, as will be described below in other example embodiments the system and methods described in this disclosure can also be applied to other formatted email messages that include message content expressed in the message body in a formatting language, such as (without limitation) RTF.

In a first step 402, an HTML email message 364 (see FIG. 2) that is addressed to a registered user of one of the mobile communications devices 201 is received by the wireless connector system 120 for processing to provide a corresponding processed email message 364A (see FIG. 2) for sending to the user's mobile communication device 201 in wireless network 101. The email message is typically received by the wireless connector system 120 from a messaging server 132, such as Microsoft Exchange, which may receive the email message from an email client, which may be a Personal Information Management (PIM) application such as Microsoft Outlook, or from a mail transport agent, such as another messaging server (not shown) or an SMTP server (not shown). The email message 364 may for example have originated from a computer or mobile communication device 201 connected to the transport facilities 112 (such as the public internet) or to the network 124.

In a second step 404 the HTML email message content is parsed to count the viewable text characters contained in the email message until a predetermined viewable text limit is reached, or until the end of the email message is reached if the viewable text limit is not reached first. By way of example, in one embodiment, each of the HTML elements in the HTML email message are sequentially parsed one by one to extract viewable text characters from the element content so that the viewable text characters can be individually counted. The parsing continues until either the end of the email message content is reached or the viewable text limit is reached. Thus, in parsing step 404 the viewable text characters are selectively counted and the rest of the email message content is ignored for the purpose of determining if the viewable text limit has been reached.

After completing parsing step 404, as indicated in step 406 the wireless connector system 120 sends however much of the email message was parsed in step 404 as corresponding email message 364A to the addressed user's mobile communications device 201. In example embodiments, the corresponding email message 364A may include some or all of the HTML elements that were parsed in step 404, including in addition to viewable text content up to the specified limit, text formatting information (as specified by tags and attributes) and viewable content that is not text. Some HTML elements may be omitted if undisplayable by the receiving mobile communication device.

Thus, in operations 400 the total HTML email message size is dynamic in that it can vary, for different HTML email messages, as the amount of viewable text determines file size as opposed to total file size however the amount of viewable text presented to the user of a device receiving the messages will remain relatively constant for messages in which the total viewable text exceeds the viewable text limit of parsing step 404. Accordingly, the user can enjoy a consistent experience. In operations 400, the size of the email message content sent is determined in dependence on the content of the message.

Figure 4:
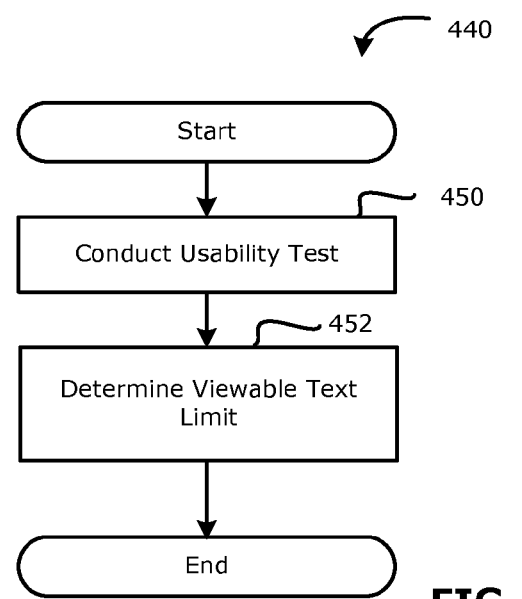
FIG. 4 is a flowchart illustrating a process for determining a viewable text limit for the process of FIG. 3.

The viewable text limit used in parsing step 404 can be set at the wireless connector system 120 using a variety of different selection methods. One possible example of a method for determining a suitable viewable text limit is illustrated by selection method 440 shown in FIG. 4. As indicated above, the typical user of a mobile communication device 201 will typically need to review a certain threshold of text characters in an initially received portion of an email message in order to evaluate if the rest of the email message needs to be immediately read or not. If the user is presented with too little text, the probability that the user will request additional content for the message increases. Conversely, providing too much content to the device user with the initially sent truncated email message can result in the use of additional network resources that are not efficiently offset by the reduction in requests for additional message content.

Accordingly, in method 440 the viewable text limit used in parsing step 404 is selected to try and minimize the amount of content regularly sent with outgoing email messages, but at the same time provide enough information to minimize requests from device users for additional message content. In one example embodiment, the optimal value for the viewable text limit is determined by conducting a usability test with a relatively large user population as indicated in step 450 of FIG. 4. As indicated on step 452, the data from the usability study is analyzed to determine an approximate viewable text limit that satisfies device users and also optimizes network resources. The default value used for the viewable text limit is set to the approximate viewable text limit that is determined in step 452.

In one example embodiment a system administrator can set the default value used for the viewable text limit globally for all mobile communications devices 201 serviced by the wireless connector system 120, or in some cases the viewable text limit can be selectively set to different values for individual users or for selected classes of devices or wireless networks. Thus, in some example embodiments, the viewable text limit can be set as a matter of global policy by the system administrator for the wireless connector system 120, or in alternative embodiments the limit may be set according to the capabilities of the addressed mobile communication device.

In some example embodiments the viewable text that is counted in parsing step 404 is selectively chosen such that in some example embodiments some viewable text content will not count towards the viewable text limit. For example, viewable text contained in one or more specified types of HTML elements may be ignored for counting purposes in parsing step 404. For example a title element in an HTML header element may be ignored and not counted when parsing step 404 is performed.

In some example embodiments steps 404 and 406 of operations 400 are again performed on additional email content that is sent in response to a user request for more content such that the additional content is sent up to a predetermined viewable text limit. The steps 404 and 406 could also be applied to the content of attachments that are sent with and email message or which are requested after an email message has been received at a mobile communications device.

Figure 5:
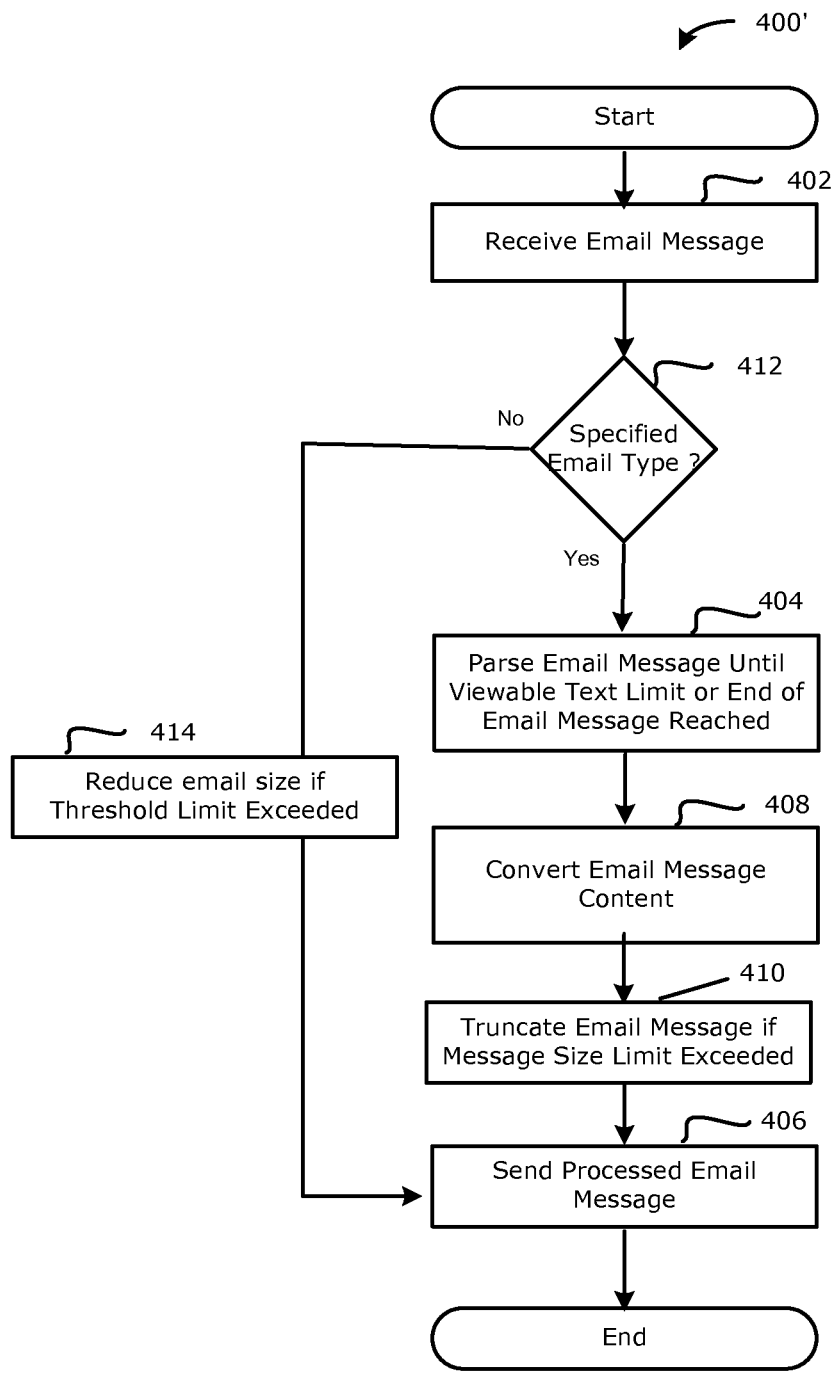
FIG. 5 is a flowchart illustrating a process for processing an email message in accordance with another embodiment of the present disclosure.

FIG. 5 illustrates email processing operations 400' implemented by wireless connector system 120 according to further example embodiments. Operations 400' are similar to operations 400 with the exception of differences that will be apparent from the Figures and this description. In some situations, an email message may have other content that so greatly exceeds the actual viewable text content that applying the viewable text limit does not result in an efficient file size for the processed email message 364A. Accordingly, in at least some example embodiments in addition to a viewable text limit as applied in step 404, a message size limit is also applied as indicated in step 410 of FIG. 5, and the amount of content included in corresponding processed email message 364A is truncated to reduce its size. In an example embodiment the viewable text limit and the message size limit are respectfully selected such that viewable text limit will generally be what determines the size of the processed email message 364A except in cases where the ratio of viewable text to other content in an email message is relatively low compared to typical email messages handled by the wireless connector system 120.

Additionally, as indicated in step 408 in FIG. 5, in some example embodiments additional processing operations are performed on the HTML elements that are parsed in step 404. For example, while the viewable text in a parsed HTML element is preserved other content in the parsed element or the tags or attributes of the parsed element can be converted by wireless connector system 120 to information or formatting instructions or content, as the case may be, that is adapted for the requirements of the receiving mobile communication device 201 or the network 101 that the device is located in. To the extent certain tags or other mark-up may not be necessary for suitable display of content on the mobile communication device 201, such tags or mark-up may be removed.

In some example embodiments, the wireless connector system 120 may receive a number of different types of email messages—for example, it may receive plain text email messages in addition to HTML email messages—where the different types of email messages may benefit from different types of size limit thresholds. By way of example, as indicated in operations 400 a preliminary determination step (step 412) can be done on an email message file to determine if it is a correct type of email for viewable text limit processing, and if so, parsing step 404 and the subsequent steps shown in FIG. 5 can all or selectively be applied. If not, a different size threshold limit can be applied to the different email type and the email message content truncated accordingly, as indicated in step 414. For example, the message types considered in step 412 could be HTML or plain text, with an HTML email message being selected for viewable text limit processing, while a plain text file would alternatively be measured only against a file size threshold in step 414.

Although operations 400, 400', and method 440 have been described primarily in the context of HTML email messages, the use of a viewable text limit for determining file size as described above in the context of operations 400, 400', and method 440 could also be applied to other types of email messages types handled by a wireless connector system 120, including other types of email messages in which content other than viewable text is included such as formatting information, including for example email messages that use formatting languages such as, but not limited to, RTF (Rich Text Format), XML (Extensible Markup Language), XHTML (Extensible HyperText Markup Language), and SGML (Standard Generalized Markup Language).

In step 404 described above, the viewable text limit is described as being a limit based on an actual per character text count. In other example embodiments, the viewable text limit may be a different limit, for example a number of lines of viewable text. In such an embodiment, during parsing in step 404 the lines of viewable text that would be displayed on a receiving mobile communication device would be counted until a limit is reached (or the end of the email message reached). The number of displayable lines of text will be affected both by a text count in a single viewable text element as the mobile communication device has a limit on how many characters it can display on a single line, and also the inclusion of formatting language that indicates text will begin on a new line. In some example embodiments, a combination of both a total viewable text character limit and a viewable text lines limit can be used in parsing step 404 to determine the length of an email message for transmission.

It will be noted that in the description provided above, viewable text content and other content that is not viewable text can be considered as different types or classes of content in an email message. Accordingly, operations 400 and 400' can be generalized in that in at least some example embodiments they comprise dynamically determining the size of an email message in dependence on a limit that is set in respect of one type of content in an email message that contains multiple types of content. In some example embodiments, of operations 400 and 400' the limit used in parsing step 404 could be set for a type of content other than viewable text—for example a limit on image data.

Figure 6:
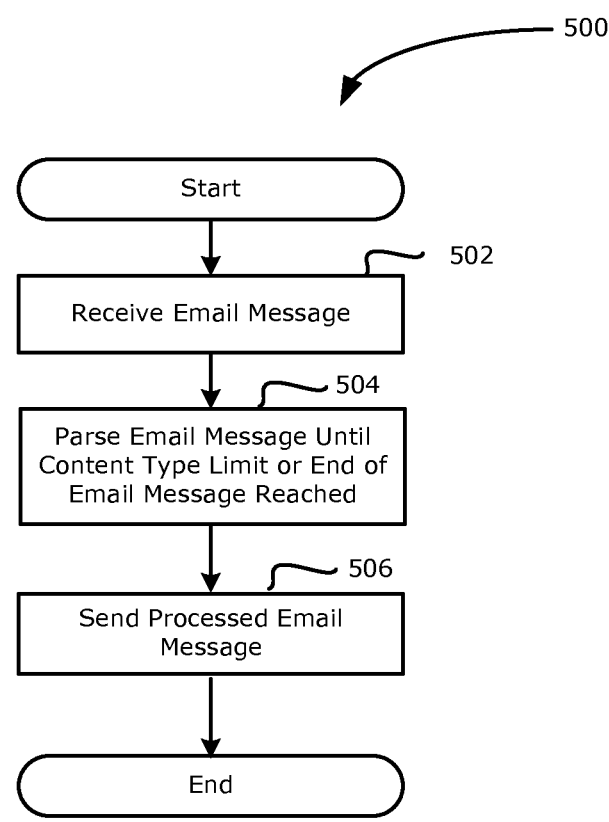
FIG. 6 is a flowchart illustrating a process for processing an email message in accordance with another embodiment of the present disclosure.

In this regard, FIG. 6 illustrates operations 500' according to yet a further example embodiment of the invention. Operations 500 are similar to operations 400 except that as will be apparent from the Figures and the following description. In a first step 502, an email message 364 that is addressed to a registered user of one of the mobile communications devices 201 is received by the wireless connector system 120 and processed to provide a corresponding processed email message 364A that is sent to the user's mobile communication device 201 in wireless network 101. The email message 364 includes at least a first type of content and a second type of content.

In a second step 504 the email message content is parsed to determine a quantity of the first type of content contained in the email message until a predetermined first content quantity limit is reached, or until the end of the email message is reached if the first content quantity limit is not reached first.

After completing parsing step 504, as indicated in step 506 the wireless connector system 120 sends however much of the email message was parsed in step 504 as corresponding email message 364A to the addressed user's mobile communications device 201.

Thus, in operations 500 the total email message size is dynamic in that it can vary for different email messages as the amount of one content type determines the size to be used in determining how much of the email message to send, initially or incrementally, as opposed to total file size. Thus the amount of the content that the limit is applied to presented to the user of a device receiving the messages will remain relatively constant for messages such that the user can enjoy a consistent experience. The limit in parsing step 504 could be determined using a method similar to that shown in FIG. 4.

In some example embodiments, unique limits may be sent for various different types of content in an email message. In such embodiments, both maximum and minimum limits may be set for different types of content to provide a consistent viewing experience—for example, it may be desirable for a email message to include a minimum amount of viewable text in combination with a maximum number of viewable images.

Thus, a method, server and system for setting the size of email messages sent to mobile communications devices is provided. In one example embodiment, a method for setting the size of email messages sent to a mobile communications device, comprises: receiving an email message that contains viewable text characters and non-viewable characters; parsing the received email message to count the viewable text characters contained in the email message until a predetermined viewable text limit is reached, or until the end of the received email message is reached if the viewable text limit is not reached first; and sending an email message that corresponds to however much of the received email message was parsed to an addressed user's mobile communications device.

According to another example embodiment there is provided a method for setting the size of email messages sent to a mobile communications device, comprising: receiving an email message that contains at least a first type of content and a second type of content that is different from the first type; parsing the received email message to determine a quantity of the first type of content contained in the email message until a predetermined first content quantity limit is reached, or until the end of the received email message is reached if the first content quantity limit is not reached first; and sending an email message that corresponds to however much of the received email message was parsed to an addressed user's mobile communications device.

While the present disclosure is primarily described as a method, a person of ordinary skill in the art will understand that the present disclosure is also directed to various apparatus such as a mobile communication device and wireless connector system for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for processing email messages for sending to a mobile communications device, comprising:

receiving an email message having message content that contains viewable text characters and non-viewable formatting characters, the non-viewable formatting characters providing formatting information for the viewable text characters;

parsing the received email message by counting the viewable text characters and ignoring the non-viewable formatting characters either until a viewable text limit is reached or until the end of the received email message is reached;

applying a message size limit;

responsive to reaching the message size limit, processing email message content to reduce a size thereof, the processing including applying the message size limit to the non-viewable formatting characters; and sending the email message content to a mobile communications device.

2. The method of claim 1 wherein the viewable text limit is a predetermined number of viewable text characters and the parsing the received email message includes counting the viewable text characters in the email message until the predetermined number of viewable text characters is reached.

3. The method of claim 1 wherein the viewable text limit is a predetermined number of viewable text lines and the parsing the received email message includes counting the viewable text characters in the email message until the predetermined number of viewable text lines is reached.

4. The method of claim 1 wherein the non-viewable formatting characters are expressed in a formatting language.

5. The method of claim 4 wherein the formatting language corresponds to one of RTF (Rich Text Format), XML (Extensible Markup Language), HTML (HyperText Markup Language), XHTML (Extensible HyperText Markup Language) or SGML (Standard Generalized Markup Language).

6. The method of claim 1 wherein the email message content includes both the viewable text characters and the non-viewable formatting characters.

7. The method of claim 1 comprising determining the viewable text limit in dependence on a device class for the mobile communications device or a class of the network in which the mobile communications device is operating.

8. The method of claim 1 wherein the processing comprises applying the message size limit to a combined size of both the viewable text characters and the non-viewable formatting characters.

9. The method of claim 1 comprising determining the viewable text limit by conducting a usability study.

10. The method of claim 1 wherein the viewable text limit is selectively set for an individual user.

11. A wireless connector system for processing and forwarding email messages to mobile communications devices located within a wireless network, the wireless connector system being configured for:
 (i) receiving an email message having message content that contains viewable text characters and non-viewable formatting characters, the non-viewable formatting characters providing formatting information for the viewable text characters;
 (ii) parsing the received email message by counting the viewable text characters and ignoring the non-viewable formatting characters either until a viewable text limit is reached or until the end of the received email message is reached; and
 (iii) applying a message size limit;
 (iv) responsive to reaching the message size limit, processing email message content to reduce a size thereof, the processing including applying the message size limit to the non-viewable formatting characters; and
 (v) sending the email message content to a mobile communications device.

12. The wireless connector system of claim 11 wherein the viewable text limit is a predetermined number of viewable text characters, and the parsing the received email message includes counting the viewable text characters in the email message until the predetermined number of viewable text characters is reached.

13. The wireless connector system of claim 11 wherein the non-viewable formatting characters are expressed in a formatting language.

14. The wireless connector system of claim 11 further configured for determining the viewable text limit in dependence on a device class for the mobile communications device or a class of the network in which the mobile communications device is operating.

15. The wireless connector system of claim 11 further configured for applying the message size limit to a combined size of both the viewable text characters and the non-viewable formatting characters.

16. The wireless connector system of claim 11 wherein the system is implemented on a computer server.

17. A non-transitory computer program product comprising a computer readable medium storing instructions implementable by a computer system for processing and forwarding email messages to mobile communications devices located within a wireless network, the stored instructions including instructions for:
 receiving an email message having message content that contains viewable text characters and non-viewable formatting characters, the non-viewable formatting characters providing formatting information for the viewable text characters;
 parsing the received email message by counting the viewable text characters and ignoring the non-viewable formatting characters either until a viewable text limit is reached or until the end of the received email message is reached;
 applying a message size limit;
 responsive to reaching the message size limit, processing email message content to reduce a size thereof, the processing including applying the message size limit to the non-viewable formatting characters; and
 sending the email message content to a mobile communications device.

\* \* \* \* \*